Jan. 27, 1925.

A. DOMBROWSKI 1,524,510

REFLECTOR FOR AUTOMOBILE HEADLIGHTS

Filed May 14, 1923

INVENTOR.
Anthony Dombrowski
BY H. G. Manning
ATTORNEY

Patented Jan. 27, 1925.

1,524,510

UNITED STATES PATENT OFFICE.

ANTHONY DOMBROWSKI, OF WATERBURY, CONNECTICUT.

REFLECTOR FOR AUTOMOBILE HEADLIGHTS.

Application filed May 14, 1923. Serial No. 638,757.

*To all whom it may concern:*

Be it known that I, ANTHONY DOMBROWSKI, a citizen of the United States, and a resident of Waterbury, county of New Haven, and State of Connecticut, have invented certain new and useful Improvements in Reflectors for Automobile Headlights, of which the following is a specification.

This invention relates to automobile headlights, and more particularly to an improved form of reflector for reducing the amount of glare from such headlights.

One object of the invention is to provide a headlight reflector of the above nature which may be attached to any form of headlight now in general use.

A further object is to provide a device of the above nature which will be simple, cheap to manufacture, and very efficient and durable in use.

With these and other objects in view, there have been illustrated on the accompanying drawing several forms in which the invention may be conveniently embodied in practice.

Figure 1:
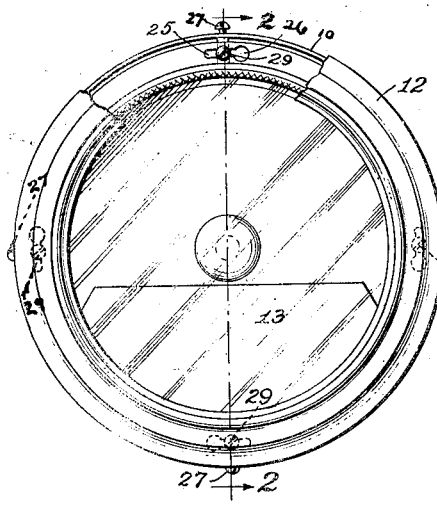
Fig. 1 represents a front view of an automobile headlight embodying one form of the invention.

Many unsuccessful attempts have been made in the past to reduce the blinding glare of automobile headlights.

The present inventor has found that most of the blinding glare of headlights is due to the light rays sent out from the lower half of the reflector which are thrown upwardly into the eyes of drivers of approaching cars. He has also found that the blinding glare can be very largely reduced by eliminating the reflection from said lower half of the reflector, and employing a substantially horizontal auxiliary reflector immediately below the bulb. This auxiliary reflector will reflect most of the rays from said bulb upwardly to the top half of said reflector where they will be again reflected and utilized.

Referring now to the drawings in which like reference numerals denote corresponding parts throughout the several views, the numeral 10 indicates a headlight casing. The casing 10 is provided with a cylindrical front section 11 having telescoped thereon an annular bezel or flange 12 for holding the lens 13 in position. The rear edge of the bezel 12 rests against an annular rib 14 on the front section 11. The rear portion of the casing is substantially semicylindrical and is provided with a horizontal flat bottom 15, which bottom 15 is connected to the cylindrical front section 11 of the casing by an inclined flat face 16. A bracket 17 is mounted on the horizontal bottom 15 and serves to support the headlight on the front part of an automobile not shown.

The reflector consists of a substantially semicircular upper section 18 having a flat horizontal section 19, and an inclined front section 20, said front section 20 being connected to said horizontal section 19 and extending to a circular rim section 21. The rim section 21 is provided with an annular groove 22 within which is seated a resilient gasket 23 of rubber, cord, or other suitable material. The rim section 21 of the reflector has an outwardly extending angle flange 24, said flange being provided on its outer edge with a series of equally spaced closed slots 25—four in this instance—said slots 25 having enlarged ends 26.

The rim holding bezel 12 is adapted to be detachably secured to the front section 11 of the casing by means of four equally spaced bolts 27, said bolts 27 being screwed into a corresponding series of lugs 28, each of said lugs having a longitudinal tapped hole to receive a screw 29, said screw 29 being adapted to pass through one of the slots 25 previously mentioned.

As will be evident, when it is desired to remove the lens 13, it will merely be necessary to unscrew the bolts 27, whereupon the bezel 12 may be slid forward and the lens will thus be released. The rear semicylindrical section of the casing is provided near its lower end with a forwardly extending tube 30 within which is fitted a tubular socket 31 preferably held rigidly therein by a driving fit. The socket 31 extends forwardly through an opening 32 in the rear of the reflector 18. The front end of the socket is provided with a pair of bayonet slots 33 which are adapted to detachably hold an electric illuminating bulb 34 by means of a pair of oppositely disposed pins 34$^a$ on said bulb.

Figure 2:
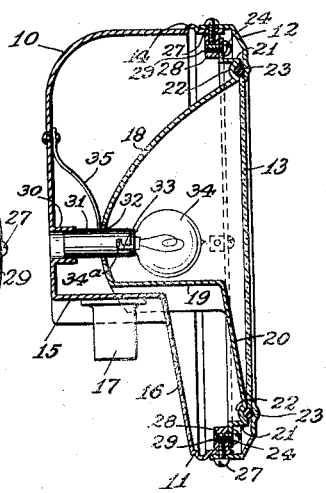
Fig. 2 is a side sectional view of the same, taken along the line 2—2 of Fig. 1, looking in the direction of the arrows.

A leaf spring 35 is riveted or otherwise secured to the rear of the casing 10 and resiliently engages the rear of the top portion 18 of the reflector, as clearly shown in Fig. 2. The reflector will thus be pressed forward at all times, and will be prevented from shaking around or rattling in the casing 10.

Figure 3:
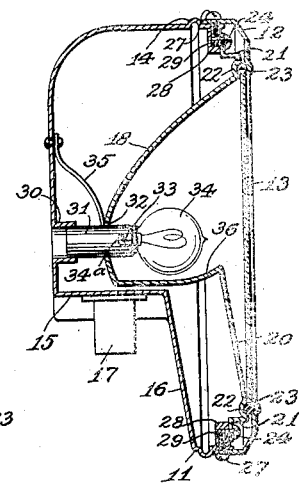
Fig. 3 is a side sectional view similar to Fig. 2, of a modified form of the invention.

In the modified form of headlight device shown in Fig. 3, the construction is similar in all respects to that shown in Figs. 1 and 2, with the exception of the base section 36 which (in Fig. 3) is curved into the shape of a section of a hollow cylinder. By means of this construction, a slightly greater proportion of the light rays from the bulb 34 will be directed back upon the upper portion of the reflector than was the case in the device shown in Fig. 2. The instensity of the headlight will thereby be somewhat increased.

Figs. 4 to 8 illustrate various forms of attachments embodying the principles of the invention, adapted to be installed upon existing headlights.

Figure 4:
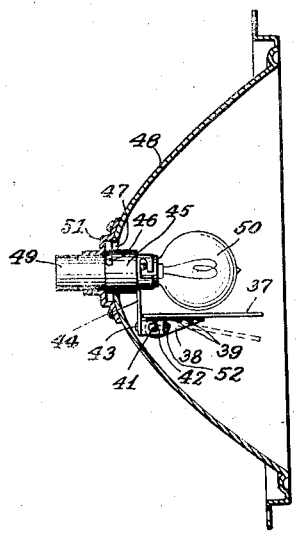
Fig. 4 is a side sectional view of an ordinary form of headlight reflector which has been equipped with an attachment constructed according to this invention.

The attachment shown in Fig. 4 comprises a flat reflecting plate 37 of polished metal substantially segment-shaped in form and having a curved inner edge lying near the surface of the concave circular reflector 48. The reflecting plate 37 is adapted to be secured in position by the means illustrated in Fig. 4, which means is identical with that shown in Fig. 7. The plate 37 is secured at its rear end to a bracket 38 as by rivets 39, the rear of said bracket 38 being reduced in width at 40 and having a pin 41 rigidly attached thereto. The pin 41 is adapted to fit within a hole in a rectangular block 42, said block 42 being attached as by rivets 43 to a depending strip 44 of a split resilient collar member 45 having a pin 46 projecting from one side. The pin 46 is adapted to pass through a slot 47 in the socket hole of a curved parabolic reflector 48 of usual construction. The split collar member 45 is adapted to resiliently grip a socket 49 carrying a bulb 50, said socket 49 being held rigidly in position by a tubular flange 51 within which the socket is held by a driving fit. The flange 51 is riveted or otherwise secured to said reflector 48.

In order to hold the plate 37 at any desired angle with respect to the axis of the reflector, the block 42 is provided with a longitudinal adjusting screw 52, which is adapted to be tightly screwed against the pin 41 for holding said plate in any desired adjusted position. As will be clear, when the plate 37 is moved from the position shown in full lines to that shown in dotted lines in Fig. 4, the beam of light produced will have a slightly greater degree of diffusion.

Figure 5:
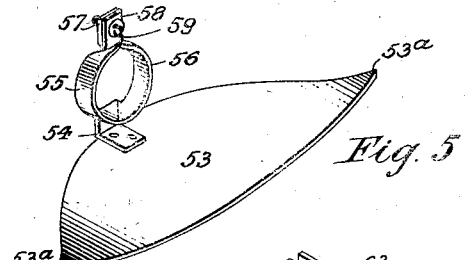
Fig. 5 is a perspective view of the attachment shown in Fig. 4.

In Fig. 5, an attachment is provided having a flat plate 53 provided with pointed ends 53$^a$. The plate 53 has a bracket 54 riveted thereto at its rear end, said bracket being provided with a pair of integral semicircular arms 55 and 56, said arms having their ends 57 and 58 perforated and twisted so as to lie in flat contact with each other. The arms 55 and 56 are secured together by a screw 59 said screw being adapted to tightly hold said bracket 54 on the outside of the lamp socket upon which it is fitted.

Figure 6:
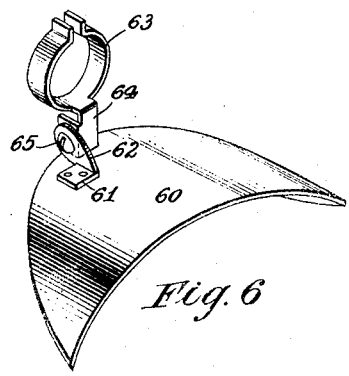
Fig. 6 is a perspective view of a modified form of attachment.

In Fig. 6, a still further modified form of attachment is shown. In this form, the polished metal plate 60 is cylindrical and convex upwardly so as to throw the light rays received from the incandescent bulb laterally, thereby increasing the diffused illumination of the headlight to some extent. The plate 60 has an angle bracket 61 riveted thereto, the upstanding arm 62 of said bracket supporting a resilient socket-engaging split ring 63. The split ring 63 is connected to the upstanding arm 62 by means of an angular depending strip 64 adapted to contact with the arm 62 to which it is adjustably secured, as by a screw 65.

Figure 7:
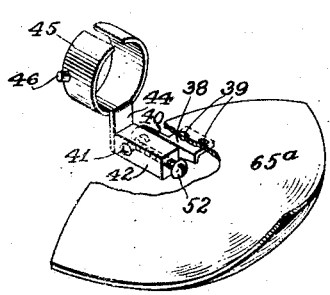
Fig. 7 is a perspective view of a further modified form of attachment.

Fig. 7 illustrates a still further modified form of attachment. This form is identical with that shown in Fig. 4 except that the polished plate 65$^a$ is concave upwardly instead of being flat. By means of this construction, an effect practically identical with that of the device shown in Fig. 3 may be obtained.

Figure 8:
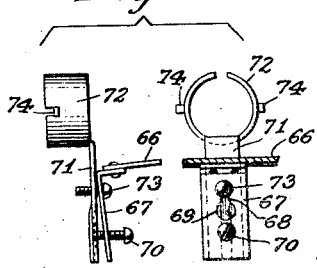
Fig. 8 shows front and side view respectively of a still further modified form of attachment.

Fig. 8 illustrates a still further modified form of adjustable bracket for securing the polished plate upon the bulb socket. In this form of bracket a polished plate 66 of any desired shape is riveted to one leg of an angular bracket 67. The other leg of the angular bracket 67 has a closed slot 68 provided with an enlarged end 69, below which slot there is a tapped hole to receive an adjustable screw 70. The screw 70 is adapted to adjustably engage the lower end of a depending strip 71 of a resilient socket-engaging split ring 72. The depending strip 71 is provided intermediate its ends with a tapped hole for receiving a screw 73 adapted to pass through the slot 68, said screw being adapted to form a pivot for the bracket 67 and the strip 71 for permitting the plate 66 to be moved to any desired angular position with respect to the axis of the reflector. The sides of the split ring 72 are provided with a pair of oppositely disposed pressed-up lugs 74, said lugs serving the same purpose as the lugs 46 shown in Figs. 4 and 7.

While there has been disclosed in this specification, several forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an automobile headlight, a casing, a reflector in said casing, a socket in the rear portion of said reflector, an illuminating bulb detachably mounted in said socket, a split collar surrounding said socket and adapted to be clamped thereto, a supporting member connected to said collar, a reflecting plate adjustably and pivotably mounted on said supporting member, and means entirely enclosed by said reflector for holding said reflecting plate in any desired adjusted angular position.

2. In an automobile headlight, a casing, a reflector in said casing, a socket at the rear of said reflector for receiving an incandescent electric bulb, a split collar surrounding said socket and having a diameter smaller than that of the socket so that it will tightly clamp said socket when fitted thereon, an arm depending from said collar, a supporting block secured to said arm, and a reflecting plate adjustably pivoted to said block for cutting off the rays of light from said bulb which would otherwise impinge upon the lower section of the reflector and then be directed upwardly and blind the eyes of drivers of approaching cars.

In testimony whereof, I have affixed my signature to this specification.

ANTHONY DOMBROWSKI.